United States Patent
Freeman

Patent Number: 6,028,704
Date of Patent: Feb. 22, 2000

[54] OPTICAL INSTRUMENT AND OPTICAL ELEMENT THEREOF

[76] Inventor: Robin John Freeman, Aquarius, The Fairway, Worplesdon, Surrey GU3 3QE, United Kingdom

[21] Appl. No.: 08/867,353

[22] Filed: Jun. 2, 1997

Related U.S. Application Data

[63] Continuation of application No. 08/705,020, Aug. 29, 1996, abandoned, which is a continuation of application No. 08/318,715, Oct. 13, 1994, abandoned.

[30] Foreign Application Priority Data

May 17, 1993 [GB] United Kingdom .................. 9310077

[51] Int. Cl.$^7$ ............................ G02B 27/44; G02B 21/60
[52] U.S. Cl. .......................... 359/565; 359/362; 359/457
[58] Field of Search ........................... 359/368, 372–374, 359/385, 389, 558, 563–573, 618–626, 630; 353/13, 38, 82; 345/8

[56] References Cited

U.S. PATENT DOCUMENTS

| | | | |
|---|---|---|---|
| Re. 29,091 | 12/1976 | De Palma et al. ...................... | 359/457 |
| 4,225,215 | 9/1980 | Cojan ....................................... | 359/630 |
| 4,390,239 | 6/1983 | Huber ....................................... | 359/457 |
| 4,695,135 | 9/1987 | Blokland et al. ........................ | 359/457 |
| 4,878,735 | 11/1989 | Vilums ..................................... | 359/565 |
| 4,927,262 | 5/1990 | Schwartz .................................. | 353/13 |
| 5,124,843 | 6/1992 | Leger et al. ............................. | 359/569 |
| 5,446,588 | 8/1995 | Missig et al. ............................ | 359/565 |
| 5,644,323 | 7/1997 | Hilderbrand et al. ..................... | 345/8 |
| 5,701,132 | 12/1997 | Kollin et al. ............................ | 345/8 |

FOREIGN PATENT DOCUMENTS

| | | |
|---|---|---|
| 463888 | 1/1992 | European Pat. Off. . |
| 2217718 | 9/1974 | France . |
| 210131 | 5/1984 | Germany . |
| 1586701 | 3/1981 | United Kingdom . |

*Primary Examiner*—Thong Nguyen
*Attorney, Agent, or Firm*—Shoemaker and Mattare Ltd.

[57] ABSTRACT

An optical instrument is described in which a diffractive element (25) is located at a focal or image plane (3) of the instrument and the diffractive element (25) is effective to produce an array (6) of a plurality of exit pupils at a viewing position for the instrument and thereby to form an enlarged exit pupil for the instrument.

14 Claims, 7 Drawing Sheets

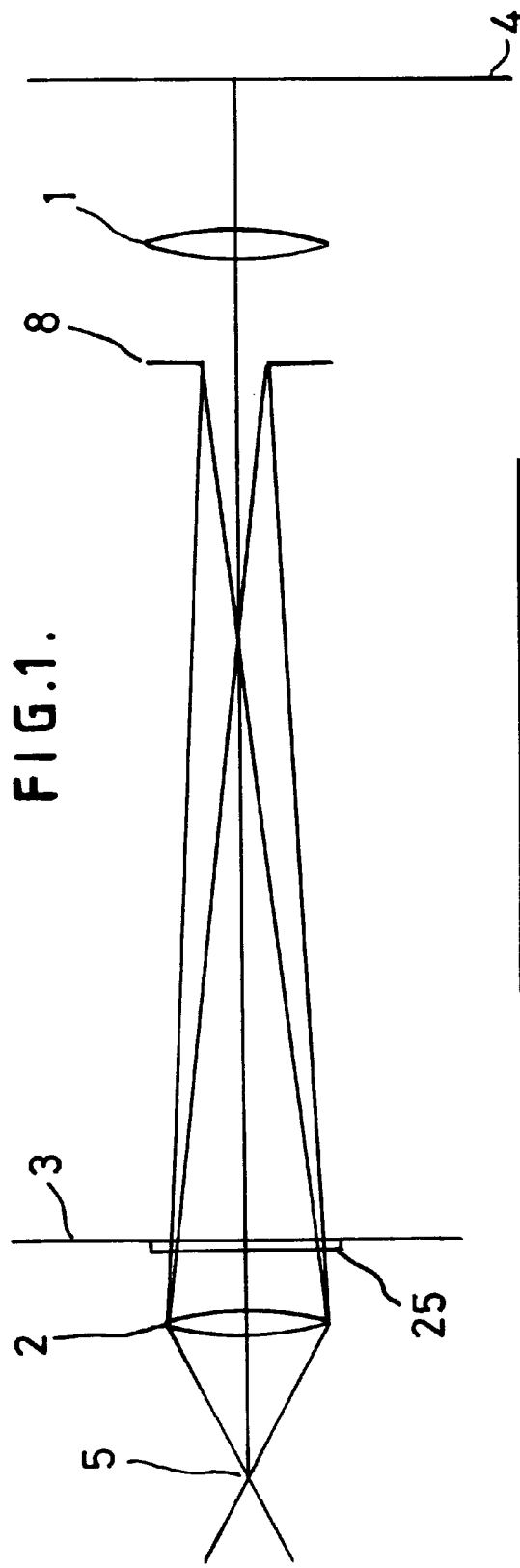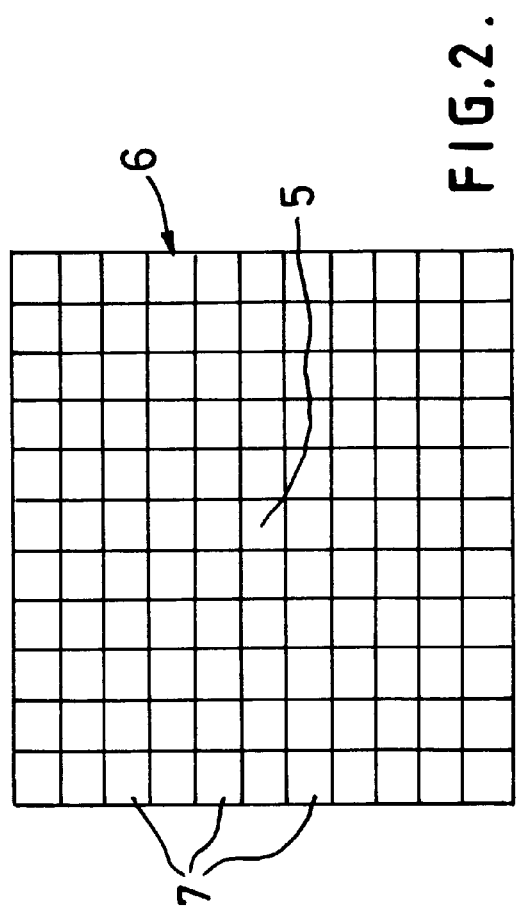

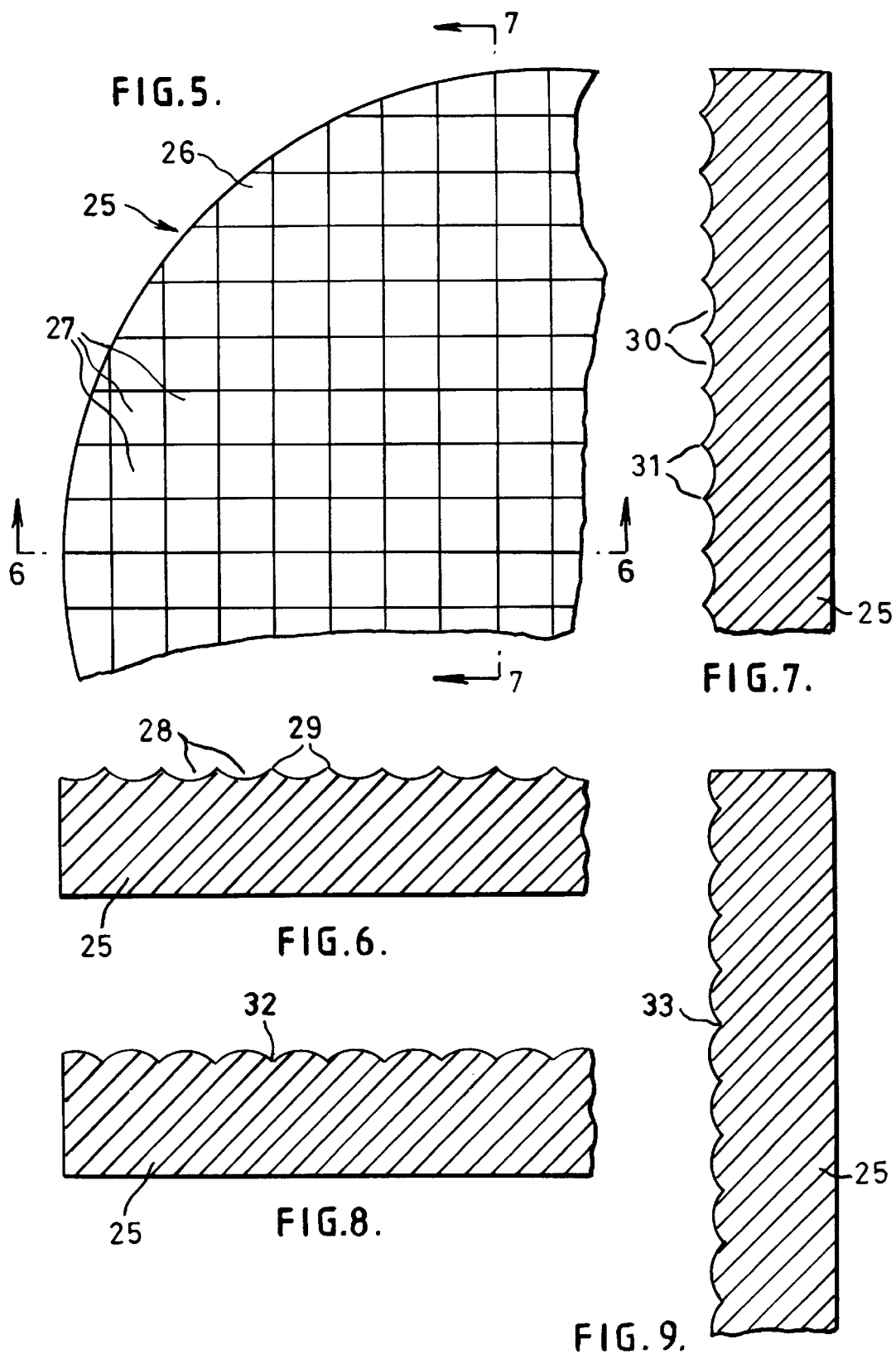

OPTICAL INSTRUMENT AND OPTICAL ELEMENT THEREOF

This application is a continuation of application Ser. No. 08/705,020, filed Aug. 29, 1996, which is a continuation of application Ser. No. 08/318,715, filed on Oct. 13, 1994, both now abandoned.

BACKGROUND OF THE INVENTION

This invention relates to optical instruments and in particular to optical instruments having an exit pupil at which an image of an object may be viewed by an observer.

In conventional optical instruments the exit pupil is of relatively small dimension. Consequently it is necessary for an observer to accurately align the entrance pupil of his eye with the exit pupil of the optical instrument in order properly to view an image or otherwise receive light from the instrument.

It would be an advantage if the necessity for an observer to accurately align the entrance pupil of his eye with a relatively small exit pupil of the instrument were removed by providing the optical instrument with an enlarged exit pupil. The observer would then be able to enjoy the freedom to receive such images or light by placing his eye pupil anywhere within an enlarged exit pupil. However the size of the exit pupil of conventional optical instruments is determined by a function of the numerical aperture of the instrument and the overall magnification of the instrument and hence the size of the exit pupil is of fixed and relatively small dimension.

SUMMARIES OF THE INVENTION

According to one aspect of the invention an optical instrument including means to produce an optical image to be viewed at an exit pupil by an observer includes means to produce an enlarged exit pupil comprising an array of a plurality of said exit pupils from which said optical image may be viewed by the observer.

Preferably the means to produce the array of the plurality of exit pupils comprises diffractive means located at an intermediate focal or image plane of the optical instrument.

The means to produce the enlarged exit pupil may comprise a diffractive element including an array of a plurality of diffractive sub-elements.

The diffractive element may be formed on or integrated with a surface of another optical element of the instrument.

According to a second aspect of the invention an optical instrument includes an object lens to produce an intermediate image in an image plane of an object in an object plane; an eyepiece to produce an exit pupil image at a viewing position of an aperture at the object lens and to produce a magnified image of said intermediate image at said exit pupil; and a diffractive element located in said image plane to produce an array of a plurality of said exit pupils at the viewing position.

According to a third aspect of the invention an optical instrument includes an object lens; a first lens to produce an intermediate exit pupil comprising an image of an aperture at the object lens; an optical field system to relay said intermediate exit pupil and an image of an object produced by said object lens and said first lens to a viewing position; and a diffractive element located in an image plane in said optical field system to produce at said viewing position an array of a plurality of said intermediate exit pupils relayed thereto by said optical field system.

According to a fourth aspect the invention encompasses a diffractive element for use in an optical instrument to produce an array of a plurality of exit pupils.

BRIEF DESCRIPTION OF THE DRAWINGS

An embodiment of the invention will now be described by way of example with reference to the drawings in which:

FIG. 1 shows optical elements of a microscope incorporating a diffractive element, FIG. 2 shows an array of exit pupils produced by the microscope of FIG. 1, FIG. 5 shows a diffractive array on an optical element, FIG. 6 is a sectional view on line 6—6 of FIG. 5, FIG. 7 is a sectional view on line 7—7 of FIG. 5, FIGS. 8 and 9 are sectional views corresponding to FIGS. 6 and 7 respectively illustrating an alternative construction of a diffractive array on an optical element.

DESCRIPTION OF THE PREFERRED EMBODIMENTS

Figure 3:
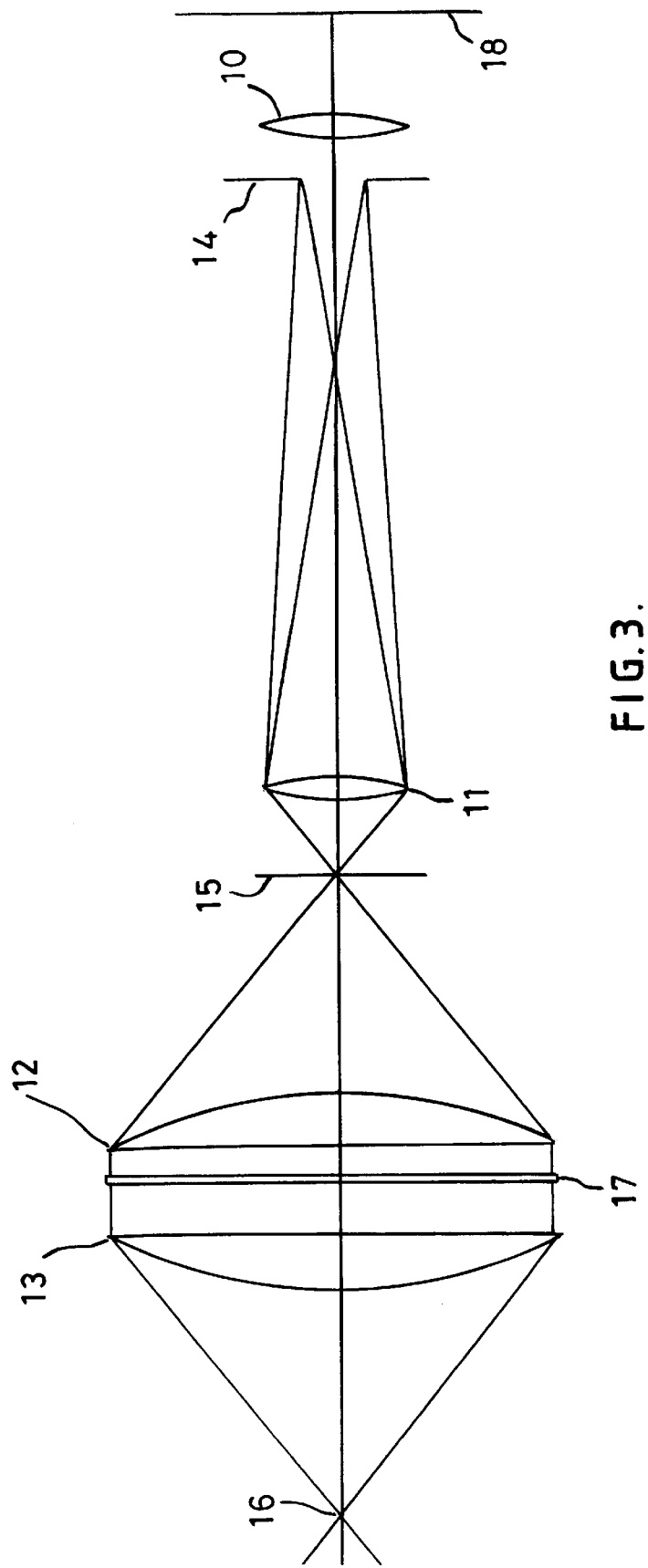
FIG. 3 shows optical elements of a projection microscope utilising a transmissive diffractive element.

Referring first to FIG. 1, a microscope includes an objective lens 1 and an eyepiece 2. The objective lens produces an intermediate image in a focal or image plane 3 of an object in an object plane 4 and, as is well known, when an eye of an observer is aligned with an exit pupil 5 of the microscope a magnified image of the intermediate image and hence of the object may be observed. The exit pupil 5 is an image of the aperture of the objective lens 1. In the microscope in accordance with the invention a transmissive diffractive element is located at the intermediate focal or image plane 3 of the microscope. The diffractive element is effective to cause the microscope to produce an array 6 (FIG. 2) of exit pupils 7 each corresponding to the exit pupil 5 which would be formed in the absence of the diffractive element 3. By suitable choice of design of the diffractive element to produce the array 7 of exit pupils, this array of exit pupils may be such that adjacent exit pupils 5, 7 are spaced apart or in contact.

If desired the aperture of the object lens may be defined by an aperture stop 8. The aperture stop 8 may be circular and the exit pupil will then also be circular. However the aperture may be of a shape which is not circular and for example may be rectangular, square or hexagonal. Accordingly the exit pupils 5, 7 are produced with a corresponding shape which may, if desired, be such that the exit pupils of the array can be located contiguous to one another with no gaps therebetween and no overlapping thereof, or the exit pupils may be spaced apart or the exit pupils may overlap to a small extent. However it will be appreciated that the location of the exit pupils relative to one another is chosen such that the array of exit pupils appears to the eye of an observer as a single continuous enlarged exit pupil. If the spacing of the exit pupils in the array is too large the array will not appear to an observer as a continuous enlarged exit pupil resulting in a loss of numerical aperture and therefore of resolution ability of the instrument.

FIG. 3 shows a projection microscope including an objective lens 10, a projection eyepiece 11 and field lenses 12, 13. In this construction of projection microscope the projection eyepiece images the aperture of the object lens 10 or, if provided, of an aperture stop 14 to form an intermediate exit pupil at an intermediate plane 15. The field lenses 12, 13 relay an image of the intermediate exit pupil at plane 15 to a final exit pupil 16 at a viewing position for an observer. A transmissive diffractive element 17 is located in a plane intermediate the field lenses 12, 13 to produce an array of images of the intermediate exit pupil in plane 15 such as to form an enlarged final exit pupil 16 at the viewing position.

Figure 4:
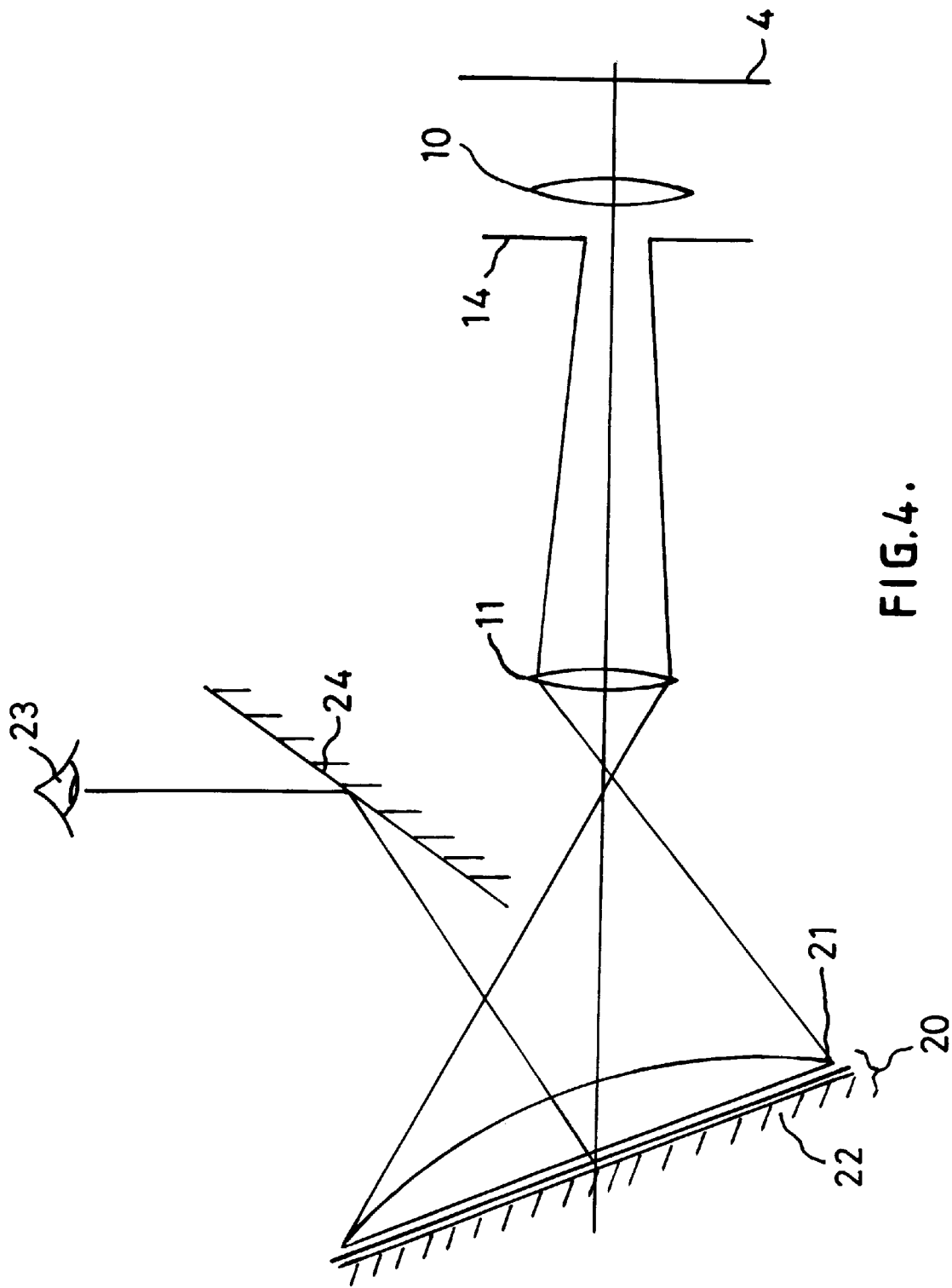
FIG. 4 shows an alternative form of projection microscope using a reflective diffractive element.
Figure 14:
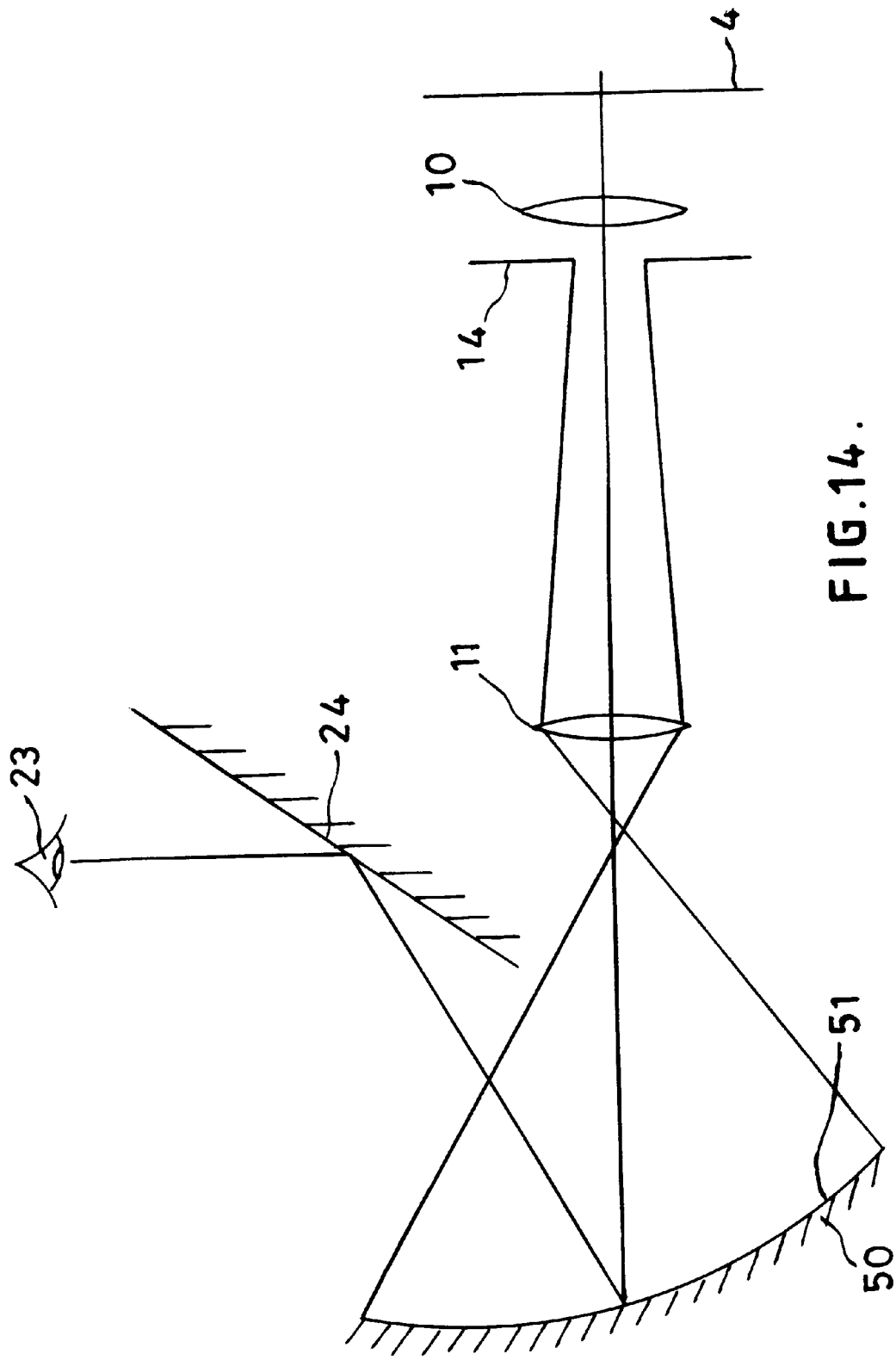

FIG. 4 shows a further embodiment of projection microscope in which, instead of forming an image at a transmissive diffractive element as in the microscope shown in FIG. 1 and the projection microscope shown in FIG. 3, the image is formed at a reflective diffractive element 20. A single field lens 21 and a reflective element 22 is provided to form an image for viewing by an eye 23 of an observer via a mirror 24. A diffractive element 25 is provided adjacent the surface of the reflective element 22. The diffractive element 25 may be a separate element as illustrated in FIG. 4 or may be integral with the reflective element 22 and be formed on the reflective surface of the reflective element 22. Instead of a field lens 21 and planar mirror 22, a concave part-spherical reflective element 50 may be provided as shown in FIG. 14. The diffractive element 51 may be integral with the concave reflective element and be formed on the part-spherical concave surface of the reflective element so that the diffractive element has the form of curvature of the surface of the reflective element.

While as shown in FIG. 2, a two dimensional array of exit pupils is produced to form a continuous enlarged exit pupil it will be appreciated that for some purposes enlargement of one dimension of the exit pupil is sufficient in which case the diffractive element is formed to produce a linear array of exit pupils and the exit pupils may be spaced apart or contiguous.

Thus it will be understood that the invention provides an optical instrument including an optical element which, when located at an intermediate image plane of the optical instrument, produces by reflective diffractive means or refractive diffractive means together with an associated field lens or mirror system, an array of exit pupils, or images of intermediate exit pupils, of the instrument at the viewing position for an eye of an observer.

Referring to FIGS. 5, 6 and 7, one form of diffraction element 25 comprises a surface 26 having an array of diffractive sub-elements 27 and the size of these sub-elements in conjunction with the field lens or reflective element system determines the separation of adjacent pupil images formed at the viewing position. The profile and form of each of the individual sub-elements determines the comparative light energy levels within each of the individual pupil images. The diffraction element 25 has a plurality of parallel first grooves 28 (FIG. 6) in the surface 26 thereof such that common parallel first edges 29 between the first grooves 28 act as a first diffractive grating. The diffraction element 25 also has a plurality of parallel second grooves 30 (FIG. 7) in the surface 26 thereof extending perpendicular to the first grooves 28 and common parallel second edges 31 between adjacent second grooves 30 act as a second diffractive grating having an orientation perpendicular to that of the first grating. The spacing, i.e. the pitch, of adjacent common first edges 29 determines the spacing of the exit pupils in a first direction and the spacing or pitch of adjacent common second edges 31 determines the spacing of the exit pupils in a second direction perpendicular to the first direction. Typically the pitch of the edges 29, 31 may be in the range of 80–160 microns. The angle and form of the wall of the grooves 28, 30 determine the dispersion of light to the plurality of exit pupils and the wall of the grooves is formed such as to produce a substantially uniform dispersion of light to the plurality of exit pupils. Instead of forming grooves in the surface 26 such that the edges 29, 31 forming a diffractive grating lie uppermost at the surface with the grooves forming troughs between the edges as shown in FIGS. 6 and 7, the element may be formed with an inverse formation such that diffraction lines 32, 33 are defined by deepest parts of grooves formed in the element.

Figures 10, 12:
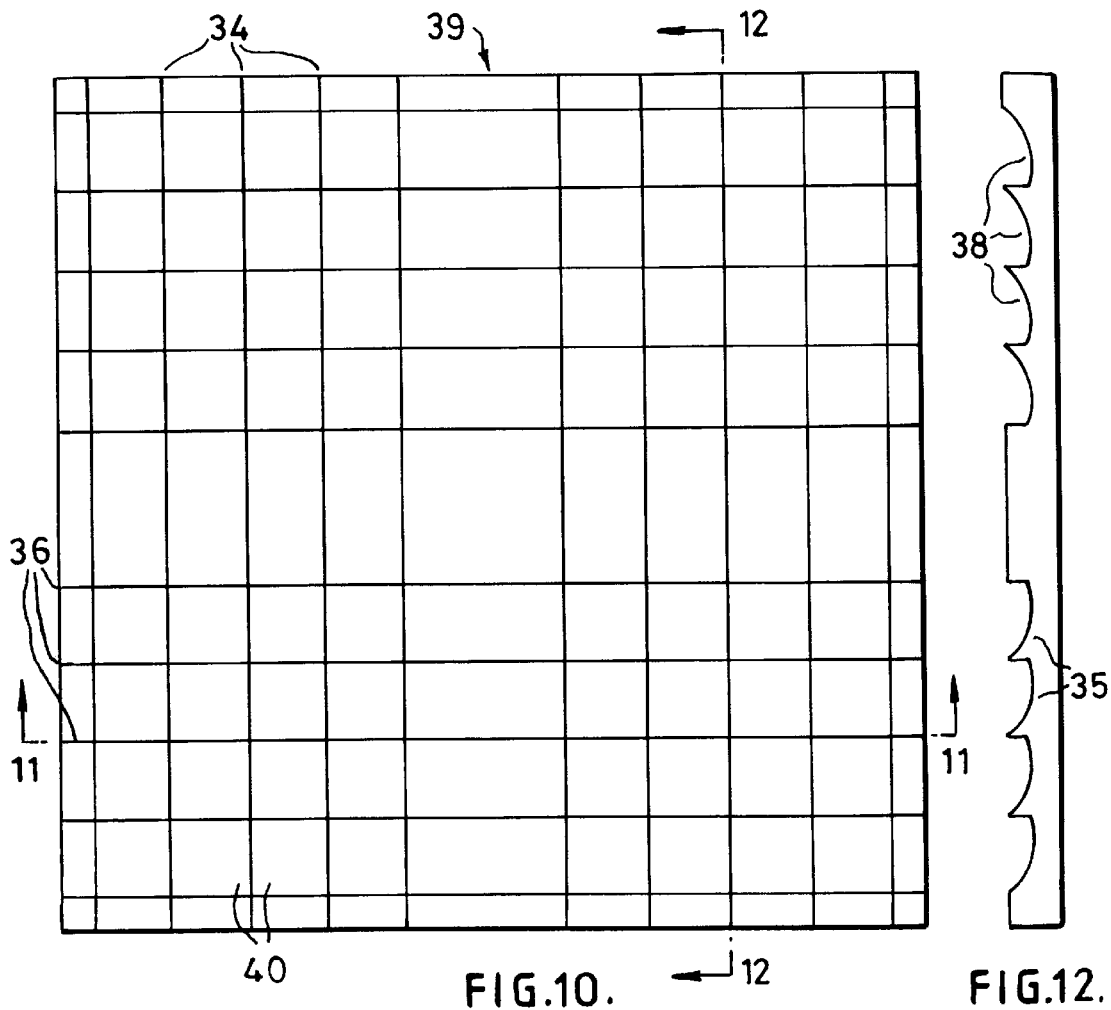
FIG. 10 shows an optical element comprising a combined fresnel lens system and diffractive array.
FIGS. 11 and 12 are sectional views on lines 11—11 and 12—12 respectively of FIG. 10.
Figure 11:
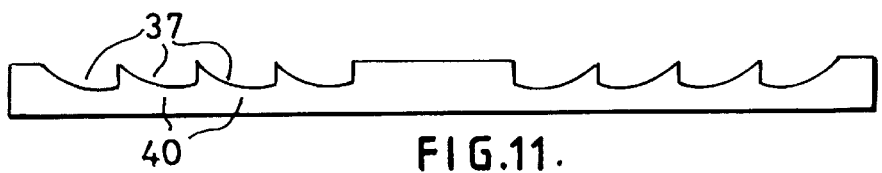

The spacing of the edges or lines forming the first and second diffractive gratings may be equal or if desired the spacing of lines or edges of one grating may be greater than the spacing of lines or edges of the other grating. Also, the cross sectional form of all of the grooves of one grating may be substantially the same or, if desired, the cross sectional form of each groove or of some grooves relative to an adjacent groove may vary to provide a required distribution of light to the exit pupils, In the construction of microscope illustrated in FIG. 3 in which field lenses 12, 13 are provided to project the image and in the construction of microscope illustrated in FIG. 4 in which a mirror and a field lens 21 are provided to project the image, the field lenses need to be at least as large as the image field. This presents disadvantages in respect of cost and weight of the instrument and where larger fields of view are required it becomes impractical to manufacture the size of field lenses required. In order to overcome these disadvantages fresnel lenses may be utilised in place of the refractive field lenses. Referring to FIG. 10, a fresnel lens system and diffractive element manufactured as an integral element 39 will now be described. Usually a circular fresnel lens comprises a plurality of concentric prismatic rings which in combination act optically in a similar manner to a refractive lens. However in the present embodiment instead of forming a conventional circular fresnel lens the required optical characteristic of a circular fresnel lens is provided by means of two mutually perpendicular cylindrical fresnel lenses, A first cylindrical fresnel lens is formed as a first pattern of parallel prismatic strips 40 defined by parallel lines 34 and a second cylindrical fresnel lens is formed as a second pattern of parallel prismatic strips 35 defined by lines 36. The strips 40 of the first pattern extend perpendicular to the strips 35 of the second pattern and hence the first and second cylindrical fresnel lenses formed by the strips are mutually perpendicular. The first and second cylindrical fresnel lenses in combination act optically as a conventional circular lens. As described hereinbefore a pattern of two mutually perpendicular sets of parallel lines is utilised to generate an array of exit pupils and similarly the pattern of parallel lines forming the first and second fresnel lenses is utilised to generate an array of exit pupils. The surfaces of the prismatic strips forming the fresnel lenses are modified as compared with a conventional fresnel lens. In a conventional fresnel lens, the surface of each ring or strip is linear in a radial direction of the ring or, in respect of a strip, in a transverse direction of the strip whereas in the present embodiment, in order to provide substantially uniform distribution of light energy to the exit pupils of an array of exit pupils generated by the first and second fresnel patterns, inclined surfaces 37, 38 of the strips 40, 35 respectively are curved as indicated in FIGS. 11 and 12. The curvature of the surface of the strips may be either positive or negative. Thus each strip may have a concave inclined surface 37, 38 as shown in FIGS. 11 and 12, or may have a convex inclined surface, the curvature of the surface being such as to provide the required substantially uniform distribution of light energy to the array of exit pupils.

Figure 13:
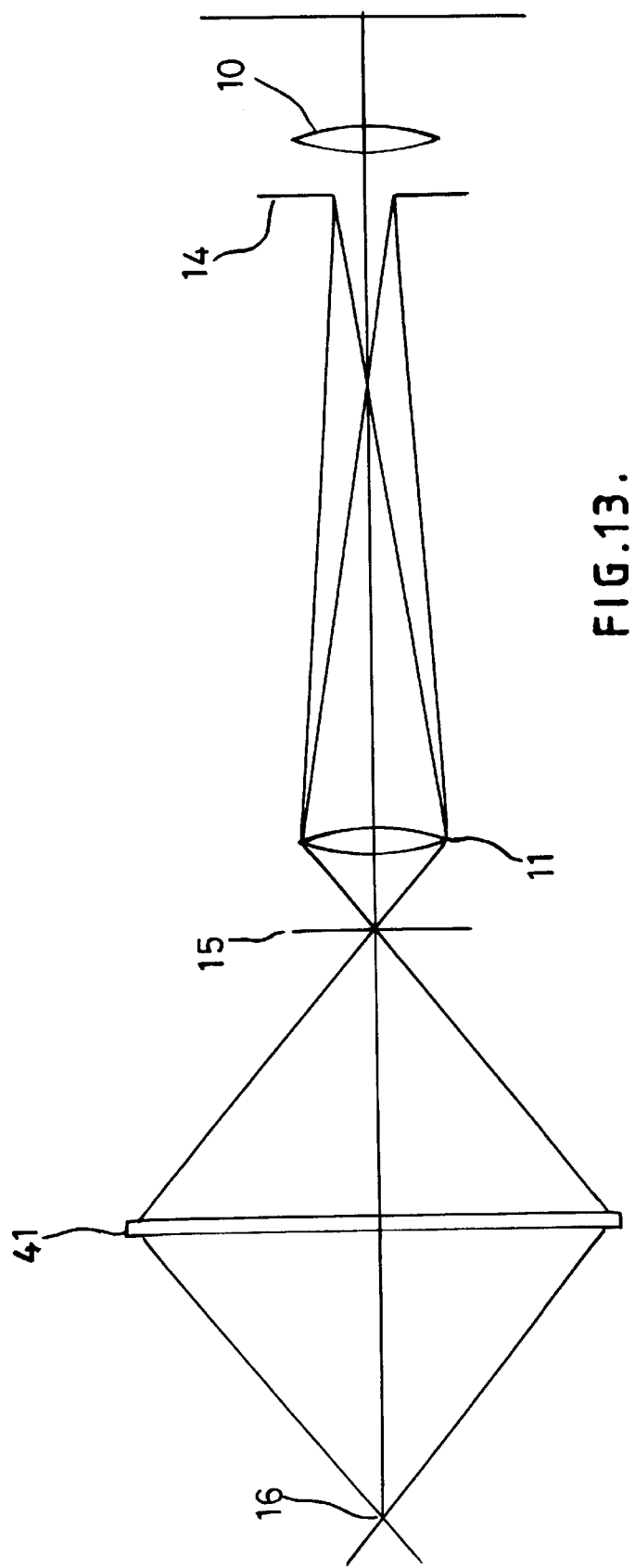
FIG. 13 shows the optical elements of a projection microscope utilising a combined fresnel lens system and diffractive array and FIG. 14 shows an alternative construction of the projection microscope illustrated by FIG. 4.

FIG. 13 is similar to FIG. 3 and illustrates a projection microscope but a single optical element 41 performs the functions of the field lens system 12, 13 (FIG. 3) and of the diffractive element 17 (FIG. 3) to generate an array of a plurality of exit pupils. Such an element is of less weight and may be manufactured economically.

It is preferred to form the first and second cylindrical fresnel lenses in a common surface of a substrate but if desired the first and second cylindrical fresnel lenses may be formed on different surfaces which in the microscope extend parallel to one another. For example, one lens pattern may be formed on one surface of a substrate and the other lens pattern may be formed on an opposite surface of the substrate. It will be appreciated that the lens pattern formed in the surface of the substrate may be an inverse pattern in the same manner as described hereinbefore with reference to the patterns of FIGS. 5 to 9.

It is envisaged that usually the diffractive element would remain stationary relative to the other optical elements of the optical instrument. However in some instances it may be desirable to move the diffractive element relative to the other optical elements of the optical instrument for example by rotation of the diffractive element about an axis perpendicular to the plane of the element, or in the case of a concave part-spherical element, about a central axis of the element. Such rotation may be effected by providing an electric motor and a drive transmission from the motor to the diffractive element.

Hereinbefore the invention has been described in relation to microscopes however it is to be understood that the invention is not limited to microscopes and may be utilised to produce enlarged exit pupils for other forms of optical instrument or apparatus.

As mentioned hereinbefore, the diffractive element 25 may be a separate element or may be formed integrally with another optical element such as a lens or mirror of the optical apparatus. When the diffractive element is formed integrally with another optical element such as a lens or mirror, the grooves and the lines comprising the diffractive grating are formed on a surface of the other optical element. This may conveniently be effected by depositing a layer of material on a surface of the optical element and then cutting or otherwise forming the grooves in the deposited layer.

It is to be understood that where reference is made in the specification to a lens, mirror or other optical element such element may comprise a single optical element or a compound optical element consisting of a combination of elements.

I claim:

1. An optical instrument including means to produce an optical image viewable by an observer at a first exit pupil; and means for producing a second exit pupil at which said optical image is viewable by an observer; said second exit pupil being of greater extent than said first exit pupil and comprising a two-dimensional array of a plurality of concurrent first exit pupils; said means to produce said two-dimensional array of the plurality of first exit pupils comprising a diffractive element located at an intermediate image plane of the optical instrument; said diffractive element comprising a substrate including a surface; a plurality of parallel first grooves in said surface; a plurality of parallel second grooves in said surface; said second grooves extending transversely relative to said first grooves; adjacent edges of said first grooves being coincident and forming first lines of a first optical diffractive grating and adjacent edges of said second grooves being coincident and forming second lines of a second optical diffractive grating.

2. An optical instrument as claimed in claim 1 wherein the first plurality of grooves forming the first optical diffractive grating and the second grooves forming the second optical diffractive grating of the diffractive element are effective to produce the plurality of first exit pupils spaced apart in the array of first exit pupils.

3. An optical instrument as claimed in claim 1 wherein the first plurality of grooves forming the first optical diffractive grating and the second grooves forming the second optical diffractive grating of the diffractive element are effective to produce the plurality of first exit pupils contiguous and with no overlap and no gaps between adjacent first exit pupils in the array of first exit pupils.

4. An optical instrument as claimed in claim 1 wherein the surface of the diffractive element is an optical surface of the means to produce an optical image.

5. An optical instrument as claimed in claim 1 wherein the means to produce an optical image includes an optical surface and the substrate of the diffractive element is supported by said optical surface.

6. An optical instrument as claimed in claim 1 wherein the first and second grooves are defined by walls having a profile effective to distribute light energy substantially uniformly to the first exit pupils in the array of a plurality of first exit pupils.

7. An optical instrument as claimed in claim 1 wherein the first grooves and first lines are formed as a first cylindrical Fresnel lens and the second grooves and second lines are formed as a second cylindrical Fresnel lens extending transversely to said first Fresnel lens.

8. An optical instrument as claimed in claim 1 wherein the diffractive element comprises an array of a plurality of diffractive sub-elements.

9. An optical instrument including an object lens to produce an intermediate image in an image plane of an object in an object plane; an eyepiece to produce a first exit pupil at a viewing position of an aperture at the object lens and to produce a magnified image of said intermediate image at said first exit pupil; a diffractive element located at said image plane of the optical instrument; said diffractive element comprising a substrate including a surface; a plurality of parallel first grooves in said surface; a plurality of parallel second grooves in said surface; said second grooves extending transversely relative to said first grooves; adjacent edges of said first grooves being coincident and forming first lines of a first optical diffractive grating and adjacent edges of said second grooves being coincident and forming second lines of a second optical diffractive grating; said first optical diffractive grating and said second optical diffractive grating being effective to produce concurrently a plurality of exit pupils located relative to one another in an array to be perceivable by an eye of an observer of said magnified image as a single continuous second exit pupil of greater extent than said first exit pupil; said magnified image being viewable by the eye of the observer at said second exit pupil.

10. An optical instrument including an object lens; an aperture at said object lens; a first lens to produce an intermediate exit pupil comprising an image of said aperture at the object lens; an optical field system to relay said intermediate exit pupil and an image of an object produced by said object lens and said first lens to a viewing position; a diffractive element located at an intermediate image plane of the optical instrument; said diffractive element comprising a substrate including a surface; a plurality of parallel first grooves in said surface; a plurality of parallel second grooves in said surface; said second grooves extending transversely relative to said first grooves; adjacent edges of said first grooves being coincident and forming first lines of a first optical diffractive grating and adjacent edges of said second grooves being coincident and forming second lines of a second optical diffractive grating; said diffractive element being effective to produce concurrently at said viewing position an array of a plurality of said intermediate exit pupils perceivable by an observer as a continuous first exit pupil of greater extent than said intermediate exit pupil.

11. An optical instrument as claimed in claim 10 wherein the optical field system comprises a combination of field lens elements.

12. An optical instrument as claimed in claim 10 wherein the optical field system comprises a combination of a field lens element and a reflective element.

13. An optical instrument as claimed in claim 10 wherein the optical field system comprises a concave reflective element.

14. An optical instrument as claimed in claim 10 wherein the diffractive element is formed integrally with a surface of one element of the optical field system.

* * * * *